Aug. 10, 1937.　　J. T. NORMAN　　2,089,220
PLANT OR FLOWER BOX
Filed March 3, 1936　　2 Sheets-Sheet 1

Inventor
Joseph T. Norman
By Albert E. Dieterich
Attorney

Aug. 10, 1937.  J. T. NORMAN  2,089,220
PLANT OR FLOWER BOX
Filed March 3, 1936   2 Sheets-Sheet 2
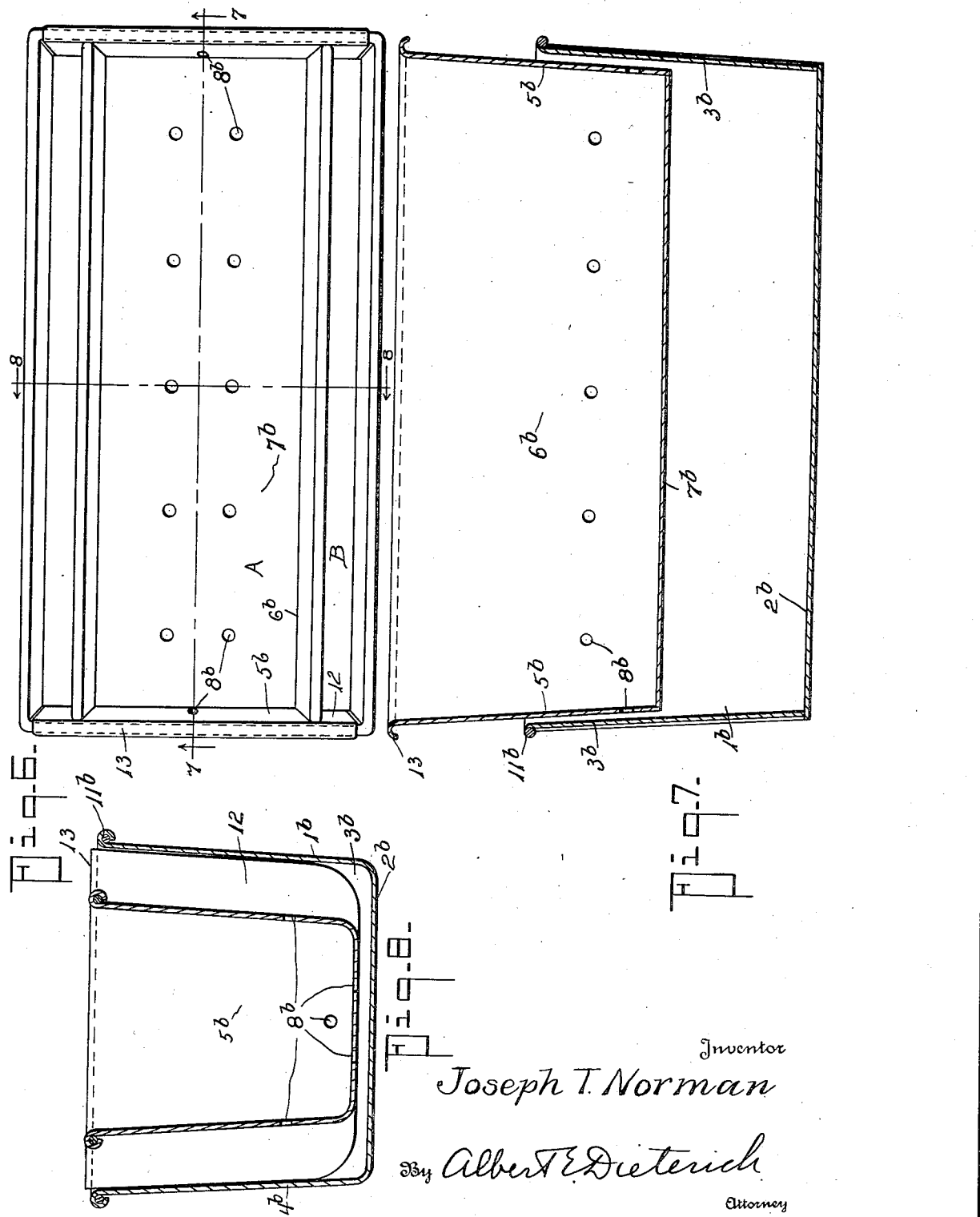
Inventor
Joseph T. Norman
By Albert E. Dieterich
Attorney Patented Aug. 10, 1937

2,089,220

UNITED STATES PATENT OFFICE 2,089,220

PLANT OR FLOWER BOX

Joseph T. Norman, Shickshinny, Pa., assignor of one-half to Edith J. Norman and one-half to Frank L. Kerstetter, both of Shickshinny, Pa.

Application March 3, 1936, Serial No. 66,905

8 Claims. (Cl. 47—38)

The present invention relates to plant or flower boxes and the invention is especially adapted to boxes which are suspended in a room or on a porch and are usually of an ornamental type, although the invention is also adapted for plant and flower boxes for all purposes—such as those used in hot houses, etc.

The invention primarily has for an object to provide a box having two compartments, an inner one for the plant and dirt in which the plant is rooted, and the other for containing a moisture holding material; the inner chamber has a perforated wall so that air and moisture from the outer chamber may pass to the inner chamber to feed the plants, to prevent the soil in the inner chamber from caking, and keeping the soil loose.

Another object of the invention is to provide a plant box in which provision is made to feed liquid fertilizer to the plant adjacent to the bottom of the roots rather than by pouring the same on the top of the soil in which the roots are embedded; by feeding the fertilizer downwardly via the moisture holding material and upwardly at the bottom into the inner chamber of the box the plant is prevented from being burned, and by using a moisture holding material in the outer chamber, which material is lighter and more porous than the soil in the inner chamber, air and moisture are drawn into the soil via the holes in and adjacent the bottom of the inner chamber.

The invention also has for an object to provide a plant box which can be made of hardwood, cast iron, sheet metal or other suitable material, and one which can be built into a hot house for growing all kinds of plants and flowers on a large scale.

Other objects will in part be obvious and in part generally pointed out hereinafter.

To the attainment of the aforesaid objects and ends, the invention still further resides in those novel details of construction, combination and arrangement of parts, all of which will be first fully described in the following description, then be fully pointed out in the appended claims, reference being had to the accompanying drawings, in which:

Figure 6 is a top plan view of a modification of the invention in which the inner chamber A is formed by a separate receptacle.

Figure 7 is a vertical longitudinal section on the line 7—7 of Figure 6, the inner receptacle being shown partly lifted out.

Figure 8 is a cross section on the line 8—8 of Figure 6.

Figure 1:
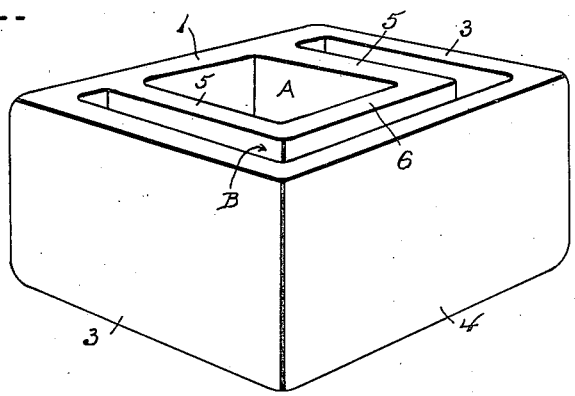
Figure 1 is a perspective view of a cast box or pot of the simplest form and embodying the invention.
Figure 2:
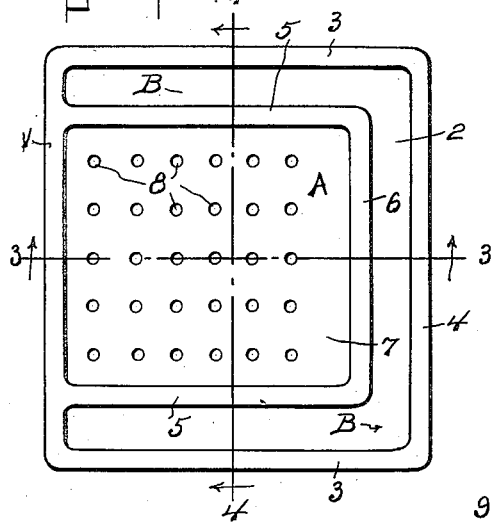
Figure 2 is a top plan view of the same.
Figure 3:
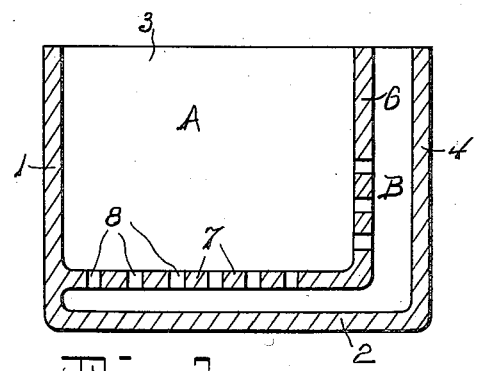
Figure 3 is a cross section on the line 3—3 of Figure 2.
Figure 4:
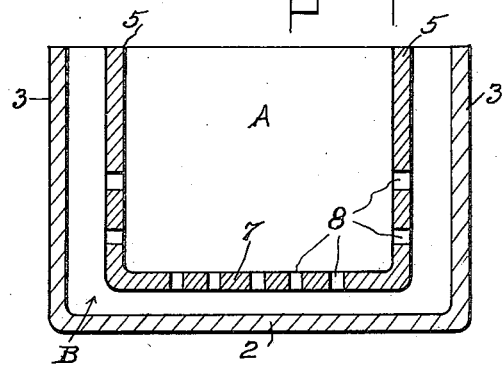
Figure 4 is a cross section on the line 4—4 of Figure 2.

In the drawings, in which like numerals of reference indicate like parts in all of the figures, 1 represents the back wall of the box, 2 the bottom, 3 the end or side walls and 4 the front wall. Within the confines of these walls there is provided a partition consisting of end or side walls 5, a front wall 6 and a bottom 7, the walls 5 and 6 and the bottom 7 being perforated at 8 to conduct moisture from the outer chamber B to the inner chamber A.

From the foregoing, it will be seen that the box is provided with two chambers, the inner chamber A in which the soil and flowers are located, and the outer chamber B for containing a moisture carrying or moisture holding material, such as rotted leaf mold mixed with feathers, or other suitable material.

The water and liquid fertilizer is poured into the outer chamber and absorbed by the material therein from which the liquid fertilizer, moisture and air is drawn by the suction of the plant into the inner chamber via the holes 8 as the plant requires the same.

Figure 5:
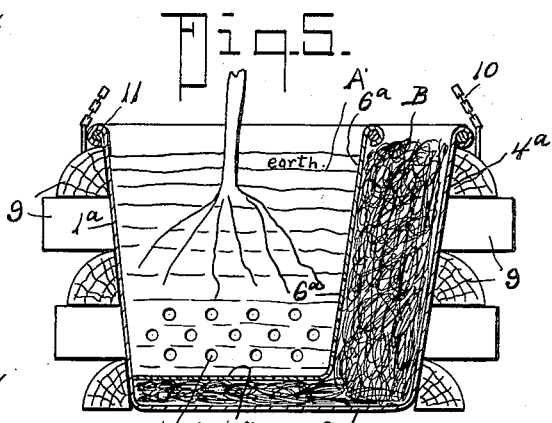
Figure 5 is a cross section showing a metal box and an ornamental cradle.

In Figure 5 is shown a modification in which the plant box is tapered to fit into an ornamental holder or cradle 9 which may be provided with suitable flexible hangers 10 to which the structure may be suspended from an overhead support (not shown).

In Figure 5 those parts which correspond to similar parts in the preceding figures bear the same reference numerals plus the index letter *a*.

The rim of the box may be reinforced by a suitable bead 11, this being particularly advisable when the box is made of sheet metal.

Instead of forming the chambers A and B in an integral structure, as shown in Figures 1 to 5 inclusive, they may be constituted by two separable receptacles as shown in Figures 6 to 8 inclusive. In these figures those parts which correspond to similar parts in Figures 1 to 5, inclusive, bear the same numbers of reference plus the index letter *b*. When the plant holder is made as shown in Figures 6 to 8, inclusive, the end walls 5<sup>b</sup> are laterally extended to the inside width of the outer receptacle by means of wings or extensions 12 and the upper edges of the end walls and their wings are curved over at 13 to hook over the top edges 11$^b$ of the outer receptacle, and thus suspend the inner receptacle in the outer one.

From the foregoing it will be seen that the plant is fed and watered through the moisture holding material, the fluid flowing downwardly to the holes in the walls of the inner chamber, thus allowing the plant to be fed from the bottom up and not from the top down, as in the old type flower pot or box. This prevents the burning of the plant when applying fertilizer or plant food and the moisture holding material, being lighter than the soil, allows air and moisture to be drawn through the holes into the inner chamber.

As heretofore intimated these boxes or parts can be made of any suitable material and in any desired shape.

What I claim is:

1. A flower or plant box comprising a body open at the top and having an inner chamber and an outer chamber spaced apart by a wall having perforations, a moisture holding material in the outer chamber and soil to receive plants held in the inner chamber.

2. A flower or plant box comprising a body open at the top and having an inner chamber and an outer chamber spaced apart by a wall having perforations adjacent the bottom of the inner chamber, a moisture holding material in the outer chamber and soil to receive plants held in the inner chamber.

3. A flower pot or plant holder comprising a body having an open top, a bottom, side walls, a front wall and a back wall, an inner wall comprising sides, a front and a bottom carried by one of said first mentioned walls and spaced from the other first mentioned walls and bottom to divide the holder into an inner compartment and an outer compartment, said inner compartment being foraminous adjacent the bottom of the inner chamber, the inner chamber being constructed to receive and retain soil and plants, and a moisture holding material located within the outer chamber for the purposes described.

4. A flower or plant box comprising a body open at the top and having an inner chamber and an outer chamber spaced apart by a wall having perforations, said body being composed of two separable units, one constituting the inner and plant receiving chamber and the other constituting the outer chamber, a pair of opposite walls of the inner unit having extensions or wings of a width corresponding to the width of the adjacent outer unit's walls, the plant receiving chamber unit being bodily removable from the outer chamber.

5. A flower or plant box comprising a body open at the top and having an inner chamber and an outer chamber spaced apart by a wall having perforations, said body being composed of two separable units, one constituting the inner and plant receiving chamber and the other constituting the outer chamber, a pair of opposite walls of the inner unit having extensions or wings of a width corresponding to the width of the adjacent outer unit's walls, and having hook-like portions to hook over the upper edges of the outer unit's walls, the plant receiving chamber unit being bodily removable from the outer chamber.

6. A flower or plant box comprising a body open at the top and having an inner chamber and an outer chamber spaced apart by a wall having perforations located wholly below the normal level of the plant roots, a moisture holding material in the outer chamber and soil to receive plants held in the inner chamber.

7. A flower or plant box comprising a body open at the top and having an inner chamber and an outer chamber spaced apart by a wall having perforations located wholly below the normal level of the plant roots, a moisture holding material in the outer chamber, soil to receive plants held in the inner chamber, said moisture holding material being such as is more porous than the soil in the inner chamber for purposes described.

8. A flower or plant box comprising a body open at the top and having an inner chamber and an outer chamber spaced apart by a wall, said body being composed of two units, one constituting the inner plant receiving unit and containing soil for plant growth, the other constituting the outer chamber and containing a moisture holding material of less density than the soil in the inner chamber, said wall being continuous above and perforated below the root level of the plant when planted in the inner chamber.

JOSEPH T. NORMAN.